UNITED STATES PATENT OFFICE.

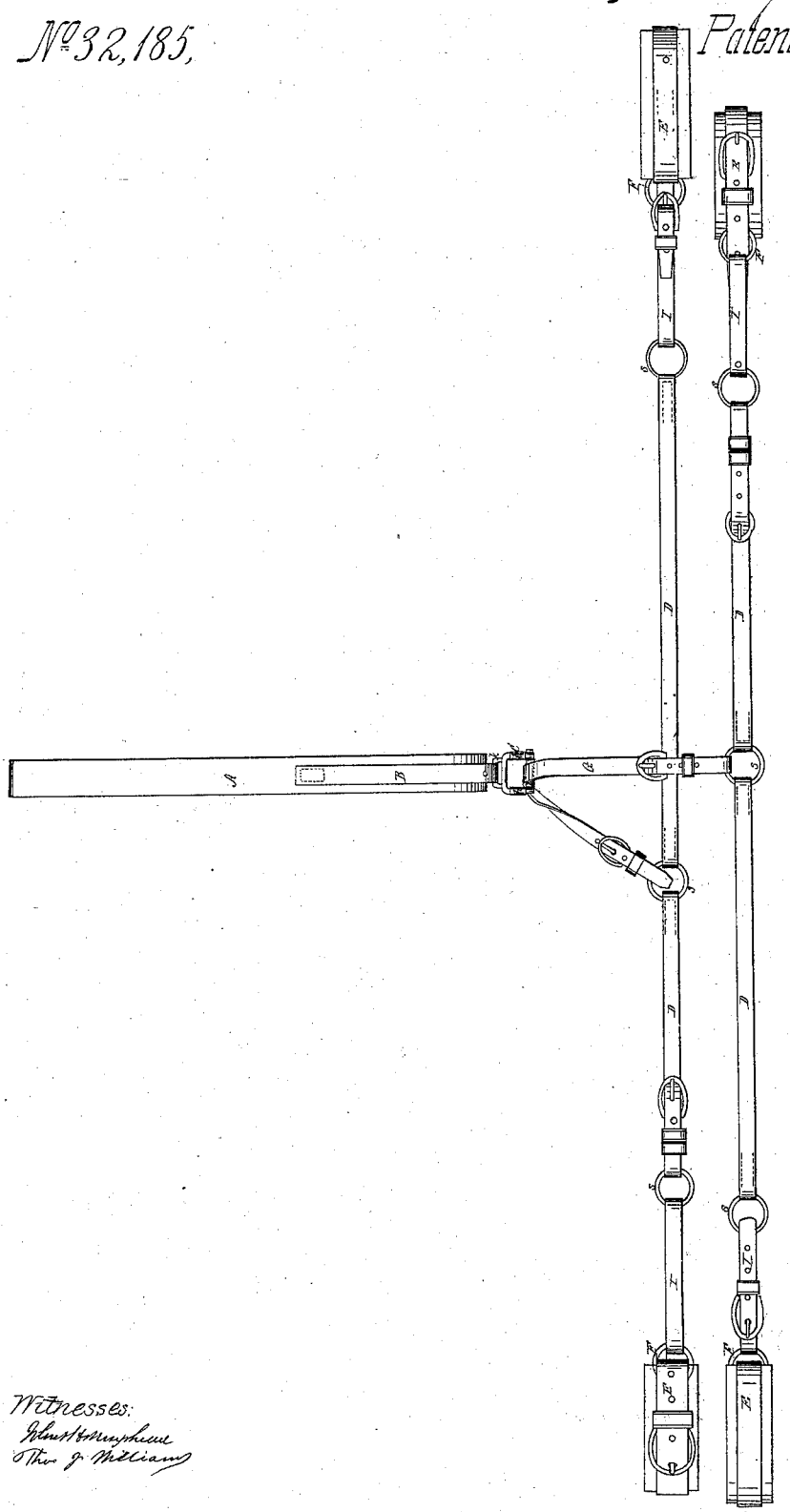

COMMODORE DANIELS, OF BARNWELL DISTRICT, SOUTH CAROLINA.

APPARATUS FOR TRAINING HORSES OR MULES TO RACK.

Specification of Letters Patent No. 32,185, dated April 30, 1861.

*To all whom it may concern:*

Be it known that I, COMMODORE DANIELS, of Barnwell District, South Carolina, have invented a certain new and Improved Mode of Training Horses and Mules to Rack or Pace; and I do hereby declare that the following is a full and exact description thereof, reference being had to the accompanying drawings and to the letters of reference marked thereon.

The nature of my invention consists in the particular arrangement of the straps herein set forth for the purpose specified.

To enable others skilled in the art to make and use my invention I will proceed to describe its construction and operation.

I make a leather surcingle (A) of the usual width with a strap B, 12" long and 1" wide attached to it so as that the center of the strap is under the horse's belly when the surcingle is buckled in the usual way. On the said strap B there is placed an iron C 1¼" square with three rollers $h, h, h,$ and a loop $k$ on the top to receive the strap B. The iron C thus connected is suspended or hung down directly under the horse's or mule's belly. Continuing the arrangement two side straps D, 36" long and 1¼" wide with three rings $s$ on each strap, one at each end and one in the middle, are provided. One ring is sewed on and the other is put on with the buckle for the purpose of shortening the strap from the center ring to the fore leg. Farther from strap E with soft pads within each one 1¼" wide two of them for the fore leg 14", and the two for the hind legs 12" with a ring F attached to each; and the side straps D are to be coupled with the straps E by means of a light strap I ¾" wide and one foot long passing them through the ring on the end of the side strap D and that on the strap E. Following up this arrangement pass the strap G 18" long and 1¼" wide through the iron C and attach its ends by means of buckles to the middle rings of straps D. The said straps D after being put tight on the animal in its natural position and the strap G made fast to each side strap D are to be buckled tight, so as to prevent shifting or slacking. The ends of the side straps are to be made fast to the fore legs above the knees and the other two ends around the fetlocks of the hind ones.

With the above arrangement a superior saddle horse gait, commonly termed racking, is secured while the strap G tends to prevent the horse from being entangled in any movement which he may make.

Having thus fully described my invention what I claim and desire to secure by Letters Patent is—

Arranging the straps (D D) (G) and surcingle (A) in the manner and for the purpose herein set forth and described.

COMMODORE DANIELS.

Witnesses:
JOHN S. HOLLINGSHEAD,
THOS. J. WILLIAMS.